Dec. 10, 1929.  W. L. KEEFER  1,739,002
AUTOMATIC ECONOMIZER AND TEMPERATURE REGULATOR FOR ELECTRIC IRONS
Filed Feb. 18, 1924   2 Sheets-Sheet 1
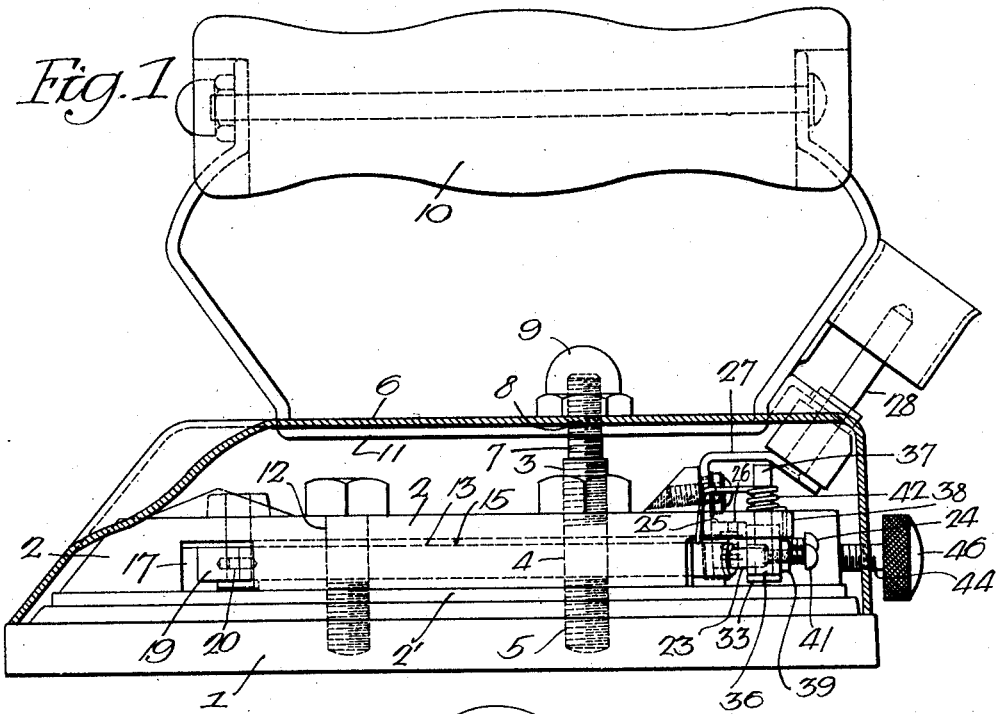
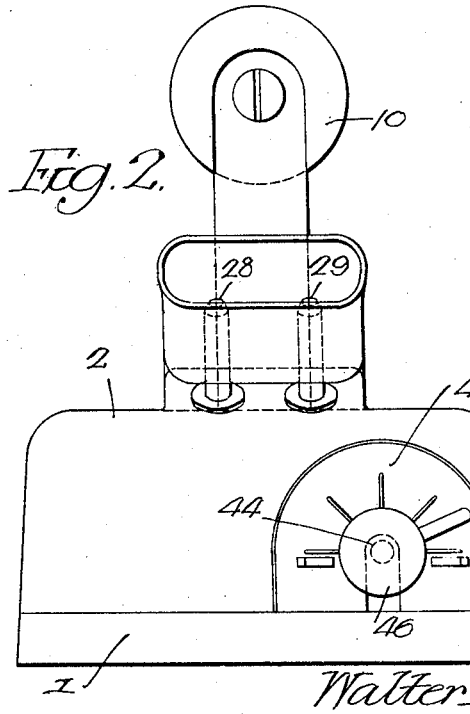
Inventor.
Walter L. Keefer.
by his Attorneys.

Dec. 10, 1929.  W. L. KEEFER  1,739,002
AUTOMATIC ECONOMIZER AND TEMPERATURE REGULATOR FOR ELECTRIC IRONS
Filed Feb. 18, 1924   2 Sheets-Sheet 2
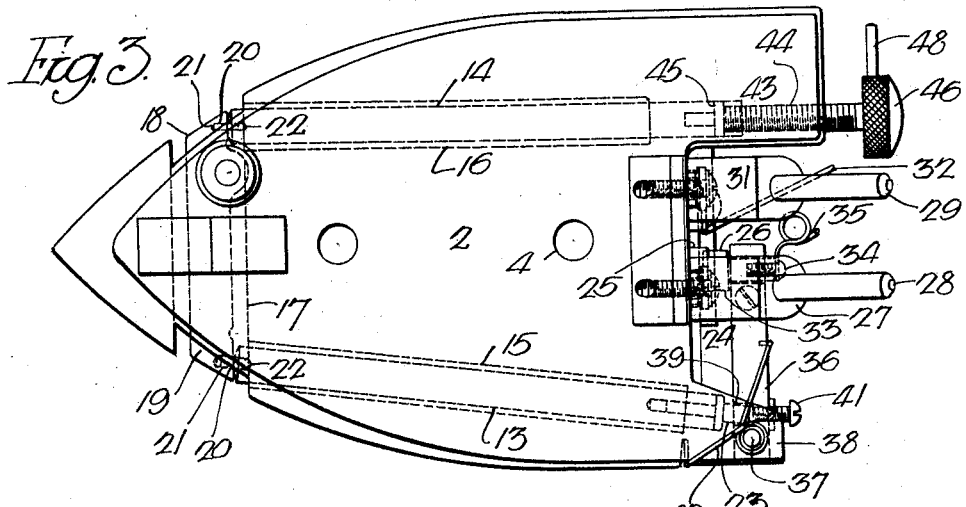
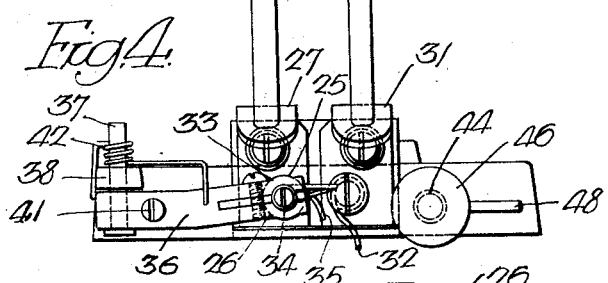
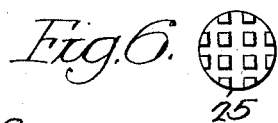
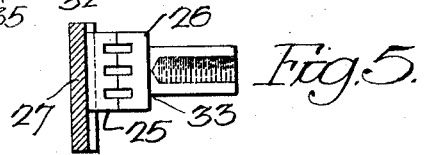
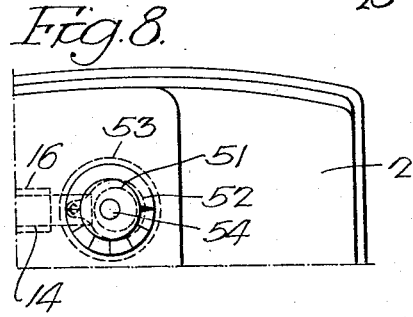
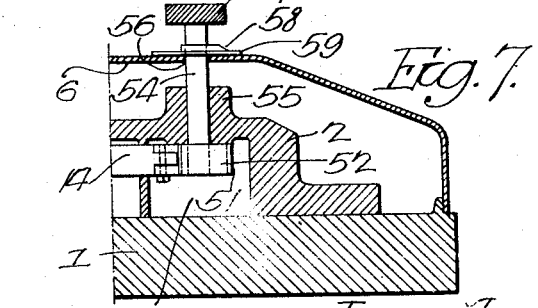
Inventor-
Walter L. Keefer.
by his Attorneys.

Patented Dec. 10, 1929

1,739,002

UNITED STATES PATENT OFFICE

WALTER L. KEEFER, OF CHAMBERSBURG, PENNSYLVANIA, ASSIGNOR TO THE WOLF CO., OF CHAMBERSBURG, PENNSYLVANIA, A CORPORATION OF PENNSYLVANIA

AUTOMATIC ECONOMIZER AND TEMPERATURE REGULATOR FOR ELECTRIC IRONS

Application filed February 18, 1924. Serial No. 693,655.

My invention relates to sadirons, having particular relation to thermostatic controls applicable thereto.

An important object of my invention is to provide an electric iron embodying means operable to maintain the temperature of the iron substantially constant at one of a number of predetermined values.

Another object of my invention is to provide means for multiplying the expansion of the thermostat elements, whereby the operation of the circuit-interrupting device may be rendered more positive.

A further object of my invention is to provide a novel form of thermostatically controlled switch, the contact elements of which are so formed as to minimize arcing and to conduct off readily the gases formed during normal operation.

A disadvantage of certain types of electric irons of the prior art is the absence of automatic temperature controlling means. The usual method of controlling the temperature of the iron is by manually interrupting the supply circuit when the temperature of the iron has reached the highest safe value, and thereafter completing the circuit when the temperature of the iron has fallen below the lowest desired value. As may be readily seen, such method of controlling the temperature of the iron involves considerable annoyance and inconvenience.

According to my invention, I provide an iron which obviates the above-noted difficulties through the utilization of a special form of automatic thermostatic control, the novel features of which will be described with greater particularity hereinafter.

With these and other objects and applications in mind, my invention further consists in the details of construction and operation and circuit arrangement, hereinafter described and claimed and illustrated in the accompanying drawings, wherein:

Figure 1, is a side elevational view, partially in section, of one form of embodiment of my invention;

Fig. 2 is an end elevational view of the structure of Fig. 1;

Figs. 3 and 4 are top-plan and end elevational views of the structure of Fig. 1, the handle and cover, respectively, being removed;

Fig. 5 is a detail view of the relatively movable contact elements and supporting members;

Fig. 6 is a view of a contacting face of one of the movable switch elements of Fig. 5; and Figs. 7 and 8 are detail, sectional and top-plan views, respectively, of a modification of my invention.

In the drawings, I have shown my invention applied to the usual type of electric iron comprising a base portion 1 and a metallic plate 2, say of cast iron, which is mounted on the upper side thereof and which is held in position by means of a threaded bolt 3, the latter extending through a perforation 4 in the plate 2 into a threaded boring 5 in the main base portion 1.

Under certain conditions of operation, I have found it advisable to insert a heating pad 2' intermediate the base member 1 and the top plate 2, and this has been shown in Fig. 1 of the drawings. A hollow cover 6 for the upper side of the members 1 and 2 may be secured in position by means of a projecting portion 7 of the bolt 3, which extends through a perforation 8 in the cover 6, and a cooperating clamping nut 9. A handle 10 may have a portion 11 thereof mounted on the cover member 6 and clamped in position by means of the nut 9. The metallic plate 2 may be further secured to the main base portion 1, as by a clamping bolt 12.

The thermostat elements, which are designed to expand and to contract in accordance with variations in the temperature of the iron, may comprise a pair of aluminum rods 13 (Figs. 1 and 3) and 14 which are loosely mounted in a pair of spaced longitudinally extending perforations 15 and 16 in the top plate 2. The end portions of the rods 13 and 14 near the front end of the iron terminate in a transversely extending recess 17, wherein is positioned expansion multiplying means adapted to interconnect said expansion rod end portions. The multiplying means may comprise a pivotally mounted lever having a short arm 18 in engagement with the rod 14 and a long arm 19 in engagement with the rod 13.

The lever arms 18 and 19 may be positively secured to the expansion rods 13 and 14 by pins 20 which are loosely mounted in the pairs of aligned borings 21 and 22 formed therein. The other end portion of the expansion rod 13 extends beyond the top plate 2 and it is provided with a steel tip 23.

A circuit-interrupting device 24, which is designed to interrupt the circuit of the iron heating element (not shown), when the temperature thereof exceeds a predetermined value, through the expansion of the rods 13 and 14, comprises a stationary contact element 25 and a co-acting movable contact element 26. The stationary contact element 25 may be carried by a conductor bracket 27, (Fig. 4), which is insulatingly secured to the top plate 2 and which provides a support for a terminal 28 of the plug connection. The other terminal 29 of the plug connection is mounted on a second insulatingly supported bracket 31 and it is connected by a conductor 32 to the iron heating element (not shown).

The movable contact element 26 may be mounted on one end of a cylindrical conducting element 33, the other end of which is provided with a clamping screw 34 for a conductor 35 which also extends to said heating element. The cylindrical member 33 is adjustably mounted in the bifurcated end portion of a non-conducting member 36, the latter being pivotally mounted on a switch pin 37 carried by a rearwardly projecting perforated shoulder 38 of the top plate 2. A portion of the pivoted member 36 immediately adjacent to the steel tip 23 is provided with a recess 39 for the reception of the same. The steel tip 23 may be adjusted in this position by a screw member 41 also carried by the member 36. A spring 42, which embraces the pin 37, may serve to maintain the co-acting contact elements 25 and 26 in resilient engagement.

Attention is directed to the serrated face of each of the contact elements, as shown in Fig. 6. Experience has shown that the channels formed by so dividing the contact face serve to conduct off the gases formed during the operation of the switch, thereby resulting in cleaner as well as cooler contact surfaces. A further advantage of such contact surfaces is the decrease effected in arcing.

As hereinbefore stated, an important feature of my invention is the provision of means for adjusting the temperature of the iron to any one of a number of predetermined values. To this end, I provide an adjustable abutment 43 for the rear end of the thermostat rod 14. In Figs. 1 and 2, the abutment 43 comprises a rod 44 having a threaded end portion extending into a correspondingly threaded portion of the top plate 2, contacting with a bearing plate 45 carried on the rear end of the expansion rod 14. The other end of the rod 44 extends through a perforation in the cover member 6 and terminates in an enlarged end portion 46 (Fig. 2) constituting an adjusting knob. A pointer 48 may also be mounted on this end of the rod 44 adapted to cooperate with a dial 49 graduated for the desired temperature variations. In one type of apparatus which I have placed on the market, the temperature range has been between the values 200 and 1000° F.

In operation, when the temperature regulator is set at 200°, the switch contacts 25 and 26 remain in engagement until the temperature of the iron reaches a value slightly greater than 200°, at which time the rods 13 and 14 have expanded sufficiently to cause the above-mentioned engagement to be broken. The temperature of the iron then falls, causing a corresponding decrease in the length of the rods 13 and 14, which continues until the temperature of the iron reaches 200°, whereupon the contacts 25 and 26 are again brought into engagement, completing the circuit of the heater element (not shown) of the iron.

In Figs. 7 and 8, I have shown a modified form of adjustable abutment in the form of an eccentric 51 and cooperating strap 52, the latter being secured to the end of the thermostat rod 14. The eccentric abutment may be supported in a recess 53, which is formed in a portion of the plate 2 adjacent to the rear end of the rod 14, by an eccentric rod 54 extending vertically through a bearing 55 in the plate 2 and a perforation 56 in the cover member 6, and terminating in a knurled knob 57. A pointer 58 on the eccentric rod 54 cooperating with a dial 59 on the cover 6 affords an indication of the operating temperature of the iron.

When the temperature regulator is set at 200°, the eccentricity of the eccentric 51 with respect to the rod 14 is a maximum, thereby causing a minimum spacing between the end of the tip 23 and the movable switch element 36. However, when the temperature regulator is set at 1000°, the eccentricity of the eccentric 51 is a minimum, and hence the temperature of the iron and also that of the rods 13 and 14 must reach a relatively higher value before the tip 23 will have moved through the greater distance to the movable switch element 36. The operation of the above modification is otherwise the same as that of the preceding figures.

While I have shown but one embodiment of my invention for the purpose of describing the same and illustrating its principles of construction and operation, it is apparent that various changes and modifications may be made therein without departing from the spirit of my invention. I desire, therefore, that only such limitations shall be imposed thereon as are indicated in the appended claims or as are demanded by the prior art.

I claim:

1. Thermostatic apparatus comprising a manually adjustable eccentric having a rotative movement only, an eccentric strap, a rod adapted to expand and contract, said eccentric strap being operatively associated with said eccentric and said rod, a switch comprising a movable switch element adapted to be actuated by said rod when the latter has reached a predetermined degree of heat, a stationary switch element cooperating with said movable switch element, and means for maintaining said switch elements in resilient engagement.

2. Thermostatic apparatus comprising an eccentric having an operating rod, a thermally responsive rod, an eccentric strap operatively associating said eccentric and said thermally responsive rod, relatively movable switch elements, of which at least one is operatively associated with said thermally responsive rod, and means for maintaining said switch elements in resilient engagement.

WALTER L. KEEFER.